(12) United States Patent
Huang et al.

(10) Patent No.: US 9,229,691 B2
(45) Date of Patent: Jan. 5, 2016

(54) METHOD AND APPARATUS FOR PROGRAMMING ASSISTANCE

(75) Inventors: Sheng Huang, Beijing (CN); Shao Chun Li, Beijing (CN); Ying Liu, Beijing (CN); Ming Lou, Beijing (CN); Yi Qi, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 13/606,094

(22) Filed: Sep. 7, 2012

(65) Prior Publication Data

US 2013/0067435 A1    Mar. 14, 2013

(30) Foreign Application Priority Data

Sep. 8, 2011    (CN) .......................... 2011 1 0264470

(51) Int. Cl.
*G06F 9/44*    (2006.01)
(52) U.S. Cl.
CPC ....................................... *G06F 8/33* (2013.01)
(58) Field of Classification Search
None
See application file for complete search history.

(56) References Cited

U.S. PATENT DOCUMENTS

| 7,110,991 | B2 | 9/2006 | Arnold et al. |
| 7,139,999 | B2 | 11/2006 | Bowman-Amuah |
| 7,617,479 | B2 | 11/2009 | Hambrick et al. |
| 8,635,204 | B1 * | 1/2014 | Xie et al. ....................... 707/709 |
| 2005/0125766 | A1 | 6/2005 | Hawley et al. |
| 2005/0278695 | A1 | 12/2005 | Synovic |
| 2012/0246610 | A1 * | 9/2012 | Asadullah et al. ............ 717/103 |

FOREIGN PATENT DOCUMENTS

CN            1811705 A      8/2006     ................ G06F 9/44

OTHER PUBLICATIONS

Chi et al. "Mining Closed and Maximal Frequent Subtrees from Databases of Labeled Rooted Trees", 2005, IEEE Transactions on Knowledge and Data Engineering, vol. 17, Issue 2, pp. 190-202.*
Holmes et al., "Using Structural Context to Recommend Source Code Examples", 2005, Proceedings of the 27th international conference on Software engineering, pp. 117-125.*
Sahavechaphan et al., "XSnippet: Mining for Sample Code", Oct. 22-26, 2006, Proceedings of the 21st annual ACM SIGPLAN conference on Object-oriented programming systems, languages, and applications, pp. 413-430.*
Yiqi Lu et al., "Detailed Technique Report on XMLSnippet", Jun. 21, 2011, retrieved from: http://gdm.fudan.edu.cn/GDMWiki/Wiki.jsp?page=XMLSnipper%20Downloads.*

(Continued)

*Primary Examiner* — Jue Louie
(74) *Attorney, Agent, or Firm* — Ido Tuchman; Jennifer R. Davis (57) ABSTRACT

A programming assistance technical solution for a framework-based application program. The application program contains program files and configuration files, including: processing configuration files of an application program history base into a configuration file classification base according to types of frameworks; constructing a Closed Frequent Subtree Set according to the configuration file classification base and determining a support of the Closed Frequent Subtree; and providing the Closed Frequent Subtree Set and the support for programming assistance. The technical solution of the present invention can be employed to assist in programming of a framework-based application program.

14 Claims, 6 Drawing Sheets

(56) References Cited

OTHER PUBLICATIONS

GDMWiki, "XMLSnippet Brief", Jun. 16, 2011, retrieved from: http://gdm.fudan.edu.cn/GDMWiki/Wiki.jsp?page=XMLSnippet%20Brief.*

GDMWiki, "XMLSnippet Usage Scenario", Jun. 16, 2011, retrieved from: http://gdm.fudan.edu.cn/GDMWiki/Wiki.jsp?page=XMLSnippet%20Usage%20Scenario.*

Bravery, A., "Changing the Corporate IT Development Model: Tapping the Power of Grassroots Computing", IBM Systems Journal, 2007, pp. 1-20, vol. 46-4.*

R. Robbes, "How Program History Can Improve Code Completion", Proceeding ASE '08 Proceedings of the 2008 23rd IEEE/ACM Automated Software Engineering, 2008, pp. 317-326.*

Manuel Vimmer, "Tropic: A Framework for Model Transformations on Petri Nets in Color", Proceeding OOPSLA '09 Proceeding of the 24th ACM SIGPLAN conference, 2009, pp. 783-784.*

R. Robbes, How Program History Can Improve Code Completion, Proceeding ASE '08 Proceedings of the 2008 23rd IEEE/ACM Automated Software Engineering, 2008, pp. 317-326.

Manuel Vimmer, Tropic: A Framework for Model Transformations on Petri Nets in Color, Proceeding OOPSLA '09 Proceeding of the 24th ACM SIGPLAN conference, 2009, pp. 783-784.

Bravery, A., Changing the Corporate It Development Model: Tapping the Power of Grassroots Computing, IBM Systems Journal, 2007, pp. 1-20, vol. 46-4.

Holmes et al., Using Structural Context to Recommend Source Code Examples, ICSE'05, pp. 1-2 (May 15, 2005).

Yingwen Zhu, Study on Frequent Subtree Mining and its Application in XML Mining, A Dissertation Submitted to Nanjing Normal University for the Academic Degree of Master of Science, School of Mathematics and Computer Science Nanjing Normal University, pp. 1-8 (Jan. 15, 2009).

English Translation of Abstract of Yingwen Zhu, Study on Frequent Subtree Mining and its Application in XML Mining, A Dissertation Submitted to Nanjing Normal University for the Academic Degree of Master of Science, School of Mathematics and Computer Science Nanjing Normal University, pp. 1-8 (Jan. 15, 2009).

* cited by examiner

METHOD AND APPARATUS FOR PROGRAMMING ASSISTANCE

CROSS REFERENCE TO RELATED APPLICATION

This application claims priority under 35 U.S.C. 119 from Chinese Application 201110264470.5, filed Sep. 8, 2011, the entire contents of which are incorporated herein by reference.

BACKGROUND OF THE INVENTION

1. Field of the Invention

The present invention relates to a technical field of programming assistance, and more specifically, to a method and apparatus that improves programming assistance.

2. Description of the Related Art

A framework-based application program is very popular in the current commercial application development environment. For example, J2EE is the most popular framework-based application. In a framework-based application, application logic exists not only in codes but also in framework configuration files, e.g., framework configuration files such as Struts, iBatis, Spring, etc.

Although the use of a framework brings many advantages, there still exists problems, such as the following: the types of frameworks are widely various, each of which has its own syntax, and requires a certain learning period; and, most of the existing frameworks come from open source software of open source communities, documents can be incomplete or outdated, and a programmer may not have enough time to command all the details.

Thus, it can be seen that there is still room for improvement on prior art, and that a technical solution of improved programming assistance is needed.

BRIEF SUMMARY OF THE INVENTION

In order to overcome these deficiencies, the present invention provides a programming assistance method for a framework-based application program, the application program containing program files and configuration files, the method including: processing configuration files of an application program history base into a configuration file classification base according to types of frameworks; constructing a Closed Frequent Subtree Set according to the configuration file classification base and determining a support of the Closed Frequent Subtree; and providing the Closed Frequent Subtree Set and the support for programming assistance.

According to another aspect, the present invention provides a programming assistance apparatus for a framework-based application program, the application program contains program files and configuration files, including: a device configured to process configuration files of an application program history base into a configuration file classification base according to types of frameworks; a device configured to construct a Closed Frequent Subtree Set according to the configuration file classification base and determine a support of the Closed Frequent Subtree; and a device configured to provide the Closed Frequent Subtree Set and the support for programming assistance.

BRIEF DESCRIPTION OF THE SEVERAL VIEWS OF THE DRAWINGS

The inventive features deemed as characteristics of the present invention are set forth in appended claims. However, the present invention itself and its preferred modes, objects, features and advantages thereof may be better understood by reading the following detailed explanation of illustrative embodiments with reference to drawings in which:

DETAILED DESCRIPTION OF THE PREFERRED EMBODIMENTS

As will be appreciated by one skilled in the art, the present invention can be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer usable non-transient program code embodied thereon.

Any combination of one or more computer readable medium(s) can be utilized. The computer readable medium can be a computer readable signal medium or a computer readable storage medium. A computer readable storage medium can be, for example, but is not limited to, an electronic, magnetic, optical, electromagnetic, infrared, or semiconductor system, apparatus, device or propagating medium, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium can be any computer readable medium that is different from a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer non-transient program code for carrying out operations for the present invention can be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the computer or other programmable data processing apparatus, create means for implementing the functions/acts specified in the flowchart and/or block diagram block or blocks.

These computer program instructions may also be stored in a computer readable medium that can direct a computer, or other programmable data processing apparatus, to function in a particular manner, such that the instructions stored in the computer readable medium produce an article of manufacture including instructions means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus to produce a computer implemented process such that the instructions which execute on the computer or other programmable apparatus provide processes for implementing the functions/acts specified in the flowchart and/or block diagram block or blocks.

Figure 1:
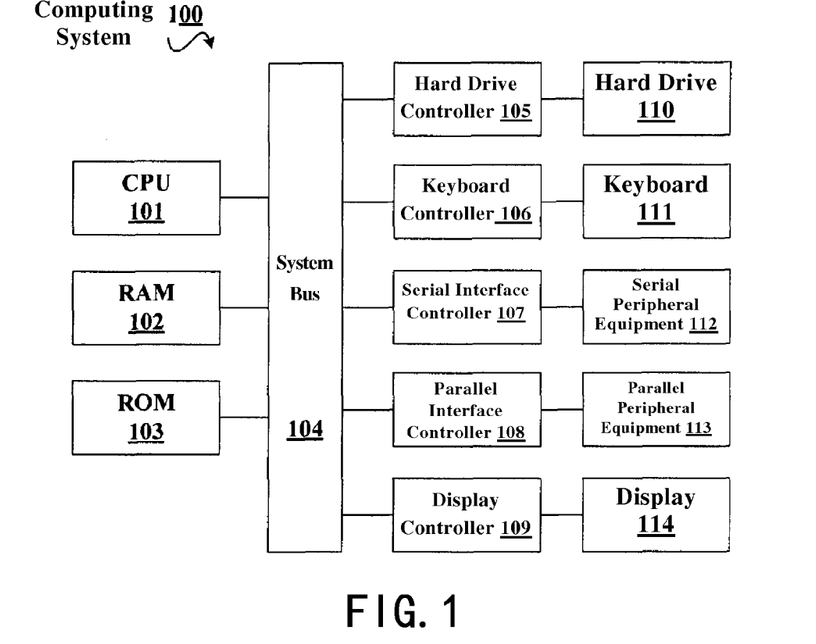
FIG. 1 illustrates a block diagram of an illustrative computer system 100 for implementing an embodiment of the present invention.

Referring now to FIG. 1, a block diagram of an illustrative computer system 100 which is applicable to implement embodiments of the present invention is illustrated. As shown in FIG. 1, the computer system 100 can include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices can be added to or removed from the computer system 100 based on specific situations.

Below, a J2EE application is taken as an example to make a detailed description on an embodiment of the present invention. Those skilled in the art should understand that the present invention is not limited to specific details of the J2EE application and the embodiment based on the J2EE application can be generalized to other framework-based application program.

A typical J2EE application has the following 6 layers: Web, Action, Service, DAO, Object and DB layers. Each of the layers includes respective program code unit. The program code unit in the Web layer is JSP. When a user submits an ActionForm through JSP to interact with the application, the Struts framework will transfer the ActionForm to a specific Action class in the Action layer according to the configuration in the configuration file struts-config.xml. After the Action class is executed, the result string will guide the application to the next JSP according to the configuration in the same configuration file.

A framework configuration file is used to describe a virtual code unit (i.e. a code unit obtained from the configuration file) represented in a respective configuration node in the configuration of a specific J2EE application under a framework and the relationship between the virtual code unit and the program code unit. Said code unit (including the virtual code unit and the program code unit) can be a class, a form request, JSP, a function and a variable, etc., in code. A code unit set can be represented as ITA (the abbreviation for IT-Artifact, meaning an IT article wherein the ITA can be divided into two parts, one part is a program code unit set CU, the other part is a virtual code unit set VU), whereas an individual code unit can be represented as ita. Herein, the ita can be one CUi (CUi indicates one program code unit), and can also be one VUi (VUi indicates one virtual code unit). Each framework (such as Spring, Struts, iBatis, etc) specifies a unique structure, syntax and semantics belonging to the configuration file of the framework, which can be referred to as a meta-model of the framework. The extraction of a framework configuration model instance requires an analysis of the configuration file of a specific J2EE application belonging to a framework according to the structure, syntax and semantics of the configuration file specified by the framework, in order to obtain respective configuration nodes in the configuration file and the relationship between the respective configuration nodes and the program code units. As for a configuration file in the format of XML, all the second level XML nodes under the XML root node can be used as configuration nodes.

For example, a segment of one Struts configuration file is shown as below:

```
<action path="/LoginFormAction" type="LoginAction" method="Login"
<forward name="success" result="List.jsp"> /action>
```

This segment of framework configuration model instance includes an action node. In combination with the semantics of Struts, it can be known that the value of the attribute "path" of the action node denotes an ita "/LoginFormAction", the value of the attribute "type" of the action node denotes an ita "LoginAction", the value of the attribute "method" of the action node denotes an ita "Login", the value of the attribute "name" of the forward subnode of the action node denotes an ita "success", and the value of the attribute "result" of the forward subnode of the action node denotes an ita "List.jsp". A control flow relationship defined by the syntax of Struts is implied among these ITAs.

Figure 2:
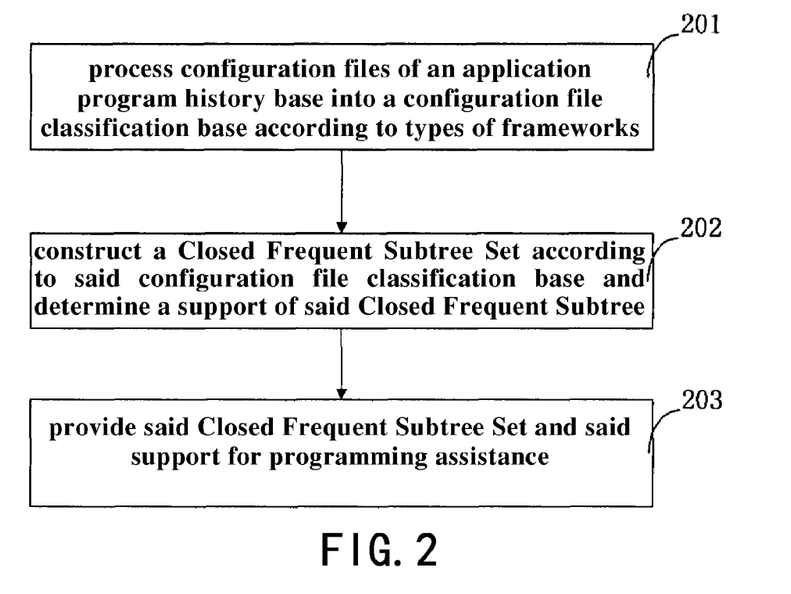
FIG. 2 illustrates a flow of a programming assistance method of a framework-based application program of the present invention.

FIG. 2 illustrates a schematic flow diagram of a programming assistance method of a framework-based application program of the present invention. Said application program contains program files and configuration files. The method includes the following steps:

In step 201, configuration files of an application program history base are processed into a configuration file classification base according to the types of frameworks. The application program history base can be constructed by collecting framework-based application programs. Framework-based application programs included in the history code base mainly include, but are not limited to, the following sources: a code base provided by each framework provider website, which can be automatically downloaded through a crawler; various framework-based codes provided by open-source communities, e.g., a code base provided by the Google code association; various framework-based codes that are unofficially issued, e.g., strictly tested codes that are written by oneself in history projects or example programs provided in classic textbooks, which can be obtained through an optical disk attached to textbooks or through downloading from the network.

In one embodiment, configuration files can be classified according to different framework configuration file tags, for example, the classification is made according to the unique "action" tag of Structs, the unique "resultMap" tag of iBatis, etc or other tags specific to framework type. Those skilled in the art may also employ other embodiments wherein processing into a configuration file classification base is performed according to types of frameworks.

In step 202, a Closed Frequent Subtree Set is constructed according to the configuration file classification base, and a support of the Closed Frequent Subtree is determined. The Closed Frequent Subtree is also referred to as Closed Frequent Tree Pattern (CTP), which is obtained through closed frequent subtree mining of the configuration file classification base. The mined Closed Frequent Subtree contains a root node and has support information. A configuration file generally takes the format of XML, but those skilled in the art will understand that the technical solution of the present application is also applicable to employ configuration files in other forms.

The support is a commonly used index known amongst those skilled in the art when constructing a frequent tree. It is, among all files of the same type, a ratio of the number of files in which the subtree appears to the number of total files. When a frequent tree of configuration files is constructed, the number of configuration files is used to calculate the support. When a frequent tree of program files is constructed, the number of program files is used to calculate the support.

In step 203, the Closed Frequent Subtree Set and the support are provided for programming assistance. In one embodiment, after this step, another step is further included, wherein according to the provided Closed Frequent Subtree Set and the support, code structures are recommended or validated when new configuration files are programmed. The recommendation or validation of code structures includes: extracting the prefix tree of the editing focus in the new configuration file being currently programmed; querying subtrees that match with the prefix tree among the Closed Frequent Subtrees; and recommending or validating code structures according to the matched subtrees and their supports. For example, it is possible to perform recommendation or validation directly according to the subtree structure with the highest support, and it is also possible to sort the matched subtrees according to the supports. Steps 201 to 202 can be performed both offline and online.

The following further improvement can also be made on the basis of the flow described in FIG. 2.

Step 202 can further include: constructing a Syntax Tree Set according to the program file portion of the application program history base, and creating an association subtree set according to the Closed Frequent Subtree Set and the Syntax Tree Set, wherein the association subtree set includes at least one Closed Frequent Subtree and Syntax Tree associated with each other.

A Syntax Tree, also referred to as Syntax Trees Patterns (STP), is widely used in various fields such as program analysis, as an intermediate representation form of program. Various source program handling tools, such as a source program browser, an intelligent editor, a language translator, etc, can be conveniently implemented by using an Abstract Syntax Tree. How to generate an Abstract Syntax Tree is not a contribution of the present invention, and many existing tools can be used to generate an Abstract Syntax Tree. Syntax Trees Patterns may vary from one language format from another, but this does not affect the implementation of the present application. It is not necessary for the Syntax Tree constructed in this step to be closed or to start from a root node, and a syntax tree in arbitrary pattern is sufficient. As an embodiment, it is also possible to construct a Syntax Tree Set by frequent syntax trees of the program file portion obtained through frequent mining, which can further improve the speed and accuracy in constructing the Syntax Tree Set.

In one embodiment, the mining is performed on obtained codes that are potentially associated with configuration files. For example, code segments that have the same strings as those in the attribute value or element value in the configuration file are obtained to perform the mining of the syntax tree.

In another embodiment, it is further necessary to determine a confidence of each association, and the confidence must at least exceed a predetermined value. Thus, when such an association has a relatively high confidence and the associated CTP and STP also have relatively high supports, the created association also has a relatively high confidence.

The step 203 can also include: providing the association subtree set for programming assistance. In one embodiment, the programming assistance according to the association is to perform the recommendation or validation of attribute values upon programming a new configuration file. According to one embodiment, the recommendation or validation of attribute values includes: extracting the prefix tree of the editing focus in the new configuration file being currently programmed; querying subtrees that match with the prefix tree among the Closed Frequent Subtrees; and performing the recommendation or validation of attribute values according to the matched subtrees and syntax trees associated therewith. Therefore, it is possible to perform the recommendation by the context of the code portion and the context of the configuration file portion. It is also possible to validate whether the finished codes coincide with commonly used association patterns, and whether errors are possibly contained, through the association between the two patterns.

Figure 3:
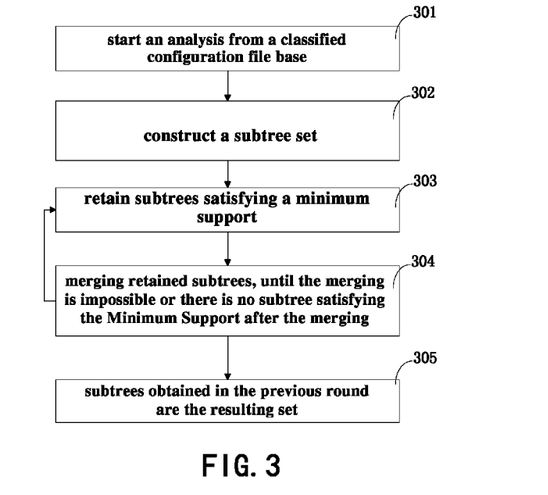
FIG. 3 illustrates a flow of constructing a CTP set according to a configuration file classification base in accordance with one embodiment.

FIG. 3 illustrates a flow of constructing a CTP set according to a configuration file classification base in accordance with one embodiment.

In step 301, analysis is started from an already classified configuration file base.

In step 302, constructing a subtree set is started from each configuration file, the subtree set having at least subtrees that contain a root node. If constructing a subtree set from the root node and the subnode is started simultaneously, it is possible to improve the speed. In another embodiment, the subtree set entirely consists of subtrees containing a root node, but the speed is lower in comparison with the case in which it is connected with the combined subtrees.

In step 303, subtrees satisfying a minimum support are retained. Among all configuration files of the same type, a ratio of the number of files in which a certain subtree appears to the number of total files is referred to as the support. A Minimum Support (simply referred to as minsup) is a threshold set according to specific circumstances.

In step 304, subtrees retained in step 303 are merge and the process returns to step 303 and continues until the merging is impossible or there is no subtree satisfying the Minimum Support after the merging. Subtrees that have common substructures are merged to generate a new subtree.

In step 305, the new subtrees obtained in the previous round are the resulting set.

In the flow, since the process is performed until it is impossible to merge to generate new, larger CTP that satisfy the support requirement, the CTP obtained in the last round is closed. Therefore, the "closed" means that the mined Frequent Subtree Set is the largest Frequent Subtree Set. There can be more than one Frequent Subtree Set as long as there is no intersection between closed frequent subtrees. Since the beginning of constructing CTP, only CTPs that satisfy the support requirement are considered. When CTPs are merged to become larger, the supports of new CTPs after the merging are also checked. In this way, it is possible to improve the speed of finding CTP that satisfy a predetermined support. Therefore, according to embodiments described above, it is possible to determine that the mining process of Closed Frequent Subtrees includes at least the following steps: constructing a subtree set according to configuration files in the configuration file classification base; merging subtrees that have common sub-structures and satisfy the Minimum Support in the subtree set to generate a new subtree set, retaining new subtrees that satisfy the Minimum Support, repeating the merging and retaining steps until the merging is impossible or there is no subtree satisfying the Minimum Support after the merging; and the new subtrees generated in the previous round form the Closed Frequent Subtree Set.

Figure 4:
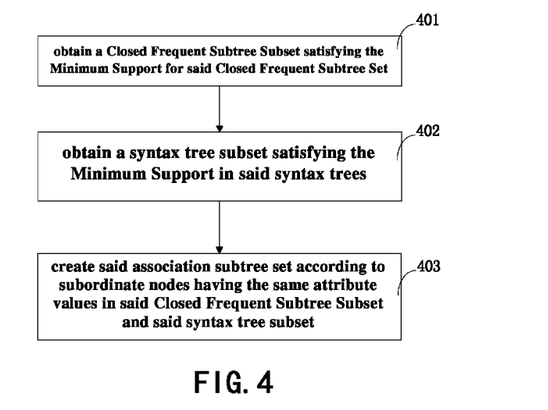
FIG. 4 illustrates a flowchart of establishing association of CTP and STP in accordance with one embodiment.

FIG. 4 illustrates a flowchart of establishing association of CTP and STP in accordance with one embodiment. The method includes the steps:

In step 401, a Closed Frequent Subtree Subset satisfying the Minimum Support is obtained from the Closed Frequent Subtree Set. The Minimum Support is set artificially according to specific requirements. In one embodiment, the Minimum Support is 70%, for example.

In step 402, a syntax tree subset satisfying the Minimum Support is obtained in the syntax trees.

In step 403, the association subtree set is created according to subordinate nodes having the same attribute values in the Closed Frequent Subtree Subset and the syntax tree subset. For the convenience of explanation, a certain Closed Frequent Subtree in a Closed Frequent Subtree Set is denoted by CTP, a certain syntax tree in a syntax tree set is denoted by STP, CTP.node denotes a subordinate node of CTP, and STP.node denotes a subordinate node of STP. When the attribute value of CTP.node is equal to the attribute value of STP.node, an association of CTP and STP with respect to the subordinate node is created through value (CTP.node)=value (STP.node). Therefore, the association subtree set consists of the Closed Frequent Subtrees and the syntax trees associated with each other with respect to specific subordinate nodes. Thus, in a certain subordinate node that generates association in CTP, associated source codes having the STP structure exist. In such associated source codes, there are corresponding strings that are the same as the attribute values at corresponding locations in the configuration files having associated CTP structures, whereby the recommendation or checking of codes can be performed.

In one embodiment, such an association may also satisfy a certain confidence. In another embodiment, as an optional step, if associations among a plurality of CTPs and STPs with respect to a certain subordinate node appear in the same framework-based application program, merging can be performed. Although these nodes that generate associations with respect to a certain subordinate node are not equal, if the probability that they appear in the same framework-based application program is also greater than a minimum confidence, such associations can be merged.

Next, an introduction of confidence will be given. First, several concepts such as Support, Confidence, Match, etc, involved in the present application are to be distinguished from each other, wherein the support is used to describe a degree of being frequency during the frequent subtree mining process and the confidence is used to describe a kind of conditional probability of an association, i.e. a degree to which an association created with respect to a certain subordinate node can be trusted. For example, Support (CTP) denotes a probability that the CTP appears in all the corresponding files (for CTP, these files are configuration files) of a Project (in the present application, a Project specially indicates a framework-based application program). For example, it assumes that there are 10 projects in the code base and the CTP appears in configuration files of 8 projects, and Support (CTP) is 80%. Similarly, the support of STP can be obtained. The match is used to describe a probability that a certain CTP and a certain STP having a subordinate node with the same attribute value appear in the same project, i.e., a probability that the CTP and the STP are associated with each other with respect to the subordinate node. For example, the CTP appears for 10 times, the STP appears for 15 times, wherein for 8 times among the 10 times the CTP appears, the CTP and the STP have the same attribute value at a certain subordinate node, so: Match (Value(CTP.node)=Value(STP.Node)=8/10=80%.

A formula Support (Match((Value(CTP.node)=Value(STP.Node))>MinMatch)) can be used to indicate a probability of satisfying Match((Value(CTP.node)=Value(STP.Node)) being greater than a certain predetermined minimum match (MinMatch) in all the projects. For example, if 6 projects from 10 projects may satisfy the condition, Support (Match (CTP, STP)>MinMatch) is 6/10=60%.

Furthermore, the confidence is denoted by the formula as:
Confidenc(CTP,STP|CTP.Node,STP.Node))=Support (Match(Value(CTP.node)=Value (STP. Node))>Match-Threshhold)/Support(CTP).

This formula means that the CTP and the STP are associated with each other with respect to the CTP.Node and the STP.Node. When the confidence of this association satisfies a predetermined minimum confidence, it can be determined that this is a valid association.

With the above example, Confidenc(CTP,STP|CTP.Node, STP.Node))=60%/80%=75%. If the minimum confidence is set to 60%, it means that in a probability of 60%, when the CTP.node appears, the value of this Node should be equal to the value of a corresponding Node in the STP.

Figure 5:
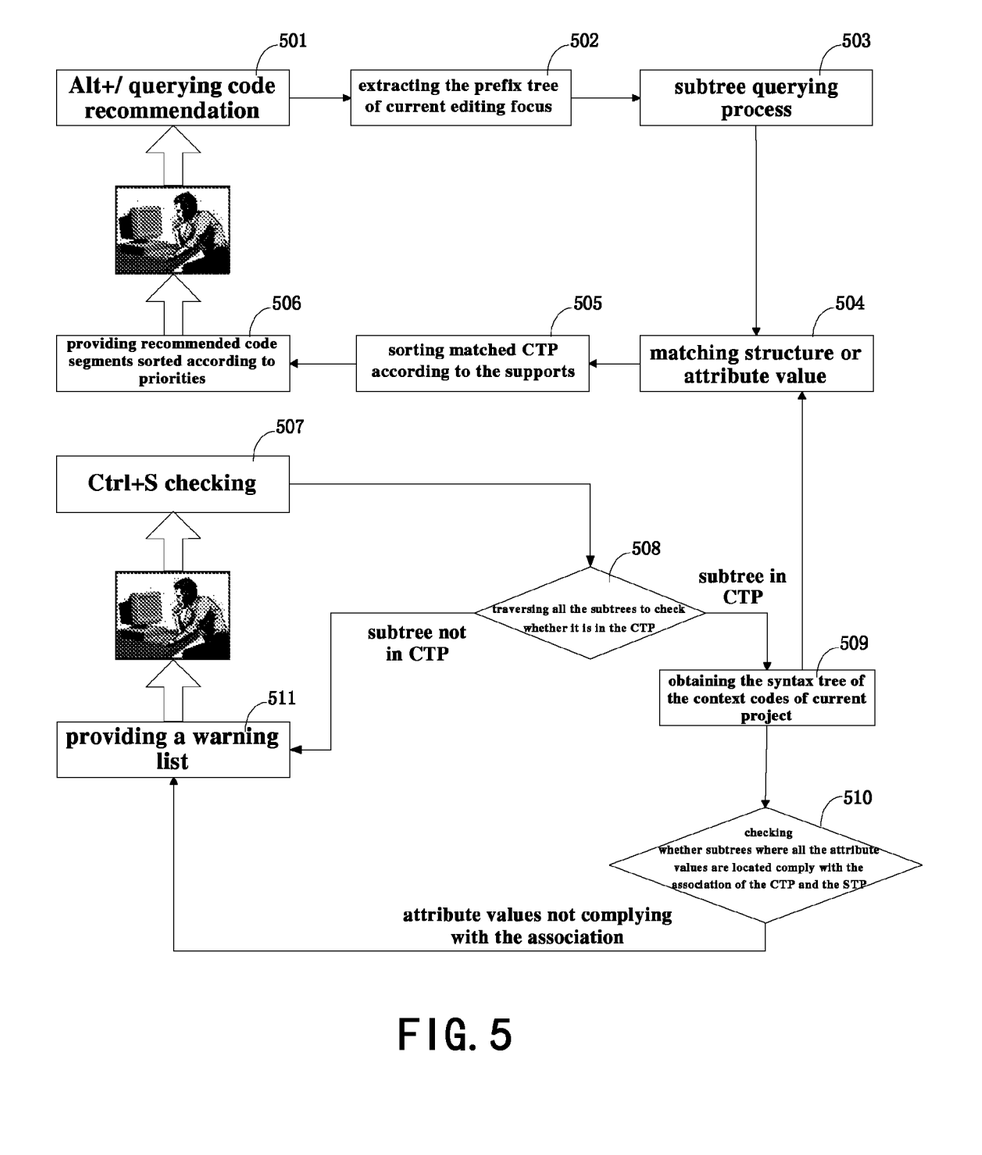
FIG. 5 illustrates a flow of implementing programming assistance in accordance with one embodiment.

FIG. 5 illustrates a flow of implementing programming assistance in accordance with one embodiment. With reference to FIG. 5, step 501 to step 506 illustrate an implementation of performing code recommendation:

In step 501, a user triggers code recommendation by a shortcut key Alt+/.

Step 502 includes extracting the prefix tree of current editing focus in the current configuration file, wherein the editing focus is a position where current cursor is located and the prefix tree is a tree corresponding to the obtained path from a root node in a currently editing statement to the editing focus.

Step 503 includes querying a matched subtree of CTP according to the prefix tree.

Step 504 includes recommending a CTP structure or an attribute value that matches with the prefix tree. If the current editing focus requires an input of a structure, a corresponding structure is recommended. During the recommending, a structure with the highest support and the most similar matching structure is selected as a candidate; if the position where the current prefix tree is located requires filling in with an attribute value, an attribute value is recommended according to matched CTP and the STP associated therewith, using their association and code context information provided in step 509.

Step 505 includes sorting according to the supports of matched CTPs.

Step 506 includes providing code segments corresponding to CTP to be selected by a programmer. For a structured pattern, code segments are XML segments that can be directly used. For a value pattern, code segments are values extracted from the context of current codes from the association of the CTP and the STP.

Step 507 to step 510 in FIG. 5 illustrate an implementation of code checking and validation in accordance with one embodiment:

Step 507 includes triggering a request for checking configuration files by a shortcut key Ctrl+S.

Step 508 includes traversing all the subtrees in configuration files. For subtrees that do not comply with the CTP, warnings are required; for those portions that comply with the CTP, the process proceeds to step 509 to perform processing.

In step 509, obtaining the syntax tree of the context codes of current project. This syntax tree can be used both in step 504 of the code recommendation and in step 510 of the code checking. When used in a configuration file, in any places where such a configuration structure exists, a corresponding code is required to be associated therewith. Code segments associated with the structure of the configuration file being currently edited is found from the context of codes being currently edited for referring to or recommending.

Step 510 includes checking whether subtrees where all the attribute values are located comply with the association of the CTP and the STP. If not, warnings are required.

Step 511 includes returning all warnings.

The present application may also be implemented as a programming assistance apparatus for a framework-based application program by implementing the method flows shown in FIGS. 2-5 in the computer system shown in FIG. 1. The application program contains program files and configuration files.

The programming assistance apparatus includes: a device configured to process configuration files of an application program history base into a configuration file classification base according to types of frameworks; a device configured to construct a Closed Frequent Subtree Set according to the configuration file classification base and to determine a support of the Closed Frequent Subtree; and a device configured to provide the Closed Frequent Subtree Set and the support for programming assistance.

In one embodiment, it further includes: a device configured to construct a Syntax Tree Set according to the program file portion of the application program history base and create an association subtree set according to the Closed Frequent Subtree Set and the Syntax Tree Set, wherein the association subtree set includes at least one Closed Frequent Subtree and Syntax Tree associated with each other; and a device configured to provide the association subtree set for programming assistance.

In one embodiment, the Closed Frequent Subtree has a root node and satisfies a predetermined Minimum Support.

In another embodiment, the device configured to construct a Closed Frequent Subtree Set according to the configuration file classification base and determine a support of the Closed Frequent Subtree includes: a device configured to start constructing a subtree set from root nodes in configuration files in the configuration file classification base; a device configured to merge subtrees that have common sub-structures and satisfy a predetermined Minimum Support in the subtree set to generate a new subtree set, to retain new subtrees that satisfy the Minimum Support, to repeat the merging and retaining steps until it is impossible to generate larger new subtrees satisfying the Minimum Support through the merging; and a device configured to determine the Closed Frequent Subtree Set according to new subtrees generated in the previous round.

In another embodiment, the device configured to create an association subtree set according to the Closed Frequent Subtree Set and the Syntax Tree Set includes: a device configured to obtain a Closed Frequent Subtree Subset satisfying the Minimum Support in the Closed Frequent Subtree Set; a device configured to obtain a syntax tree subset satisfying the Minimum Support in the syntax trees; and a device configured to create the association subtree set according to subordinate nodes having the same attribute values in the Closed Frequent Subtree Subset and the syntax tree subset.

In another embodiment, the device further includes: a device configured to recommend or validate code structures according to the provided Closed Frequent Subtree Set and the support when a new configuration file is programmed.

In another embodiment, the device configured to recommend or validate code structures includes: a device configured to extract the prefix tree of the editing focus in the new configuration file being currently programmed; a device configured to query subtrees that match with the prefix tree among the Closed Frequent Subtrees; and a device configured to recommend or validate code structures according to the matched subtrees and their supports.

In another embodiment, the device further includes: a device configured to recommend or validate attribute values according to the provided association subtree set when a new configuration file is programmed. In an example, the device configured to recommend or validate attribute values includes: a device configured to extract the prefix tree of the editing focus in the new configuration file being currently programmed; a device configured to query subtrees that match with the prefix tree among the Closed Frequent Subtrees; and a device configured to perform the recommendation or validation of attribute values according to the matched frequent subtrees and syntax trees associated therewith.

The present application is a technical solution for assisting a programmer in programming in a configurable framework-based programming mode, which can assist in the coding of configuration files. By dynamically matching subtrees of a new configuration file with hotspot structure patterns represented by closest frequent subtrees, it is possible to suggest to a programmer the right configuration file elements; and it is also possible to suggest to a programmer the right values of configuration file elements through syntax trees associated therewith. Therefore, the technical solution of the present application can be employed to reuse or mine the hotspot user experience for programming assistance. Codes provided by the hotspot user will be often used, and such codes have a good structural logic combination, which is able to provide a good performance.

Next, the implementation of the above technical solution will be explained by a specific example. The example is not intended to limit the protection scope of the present application.

Figure 6:
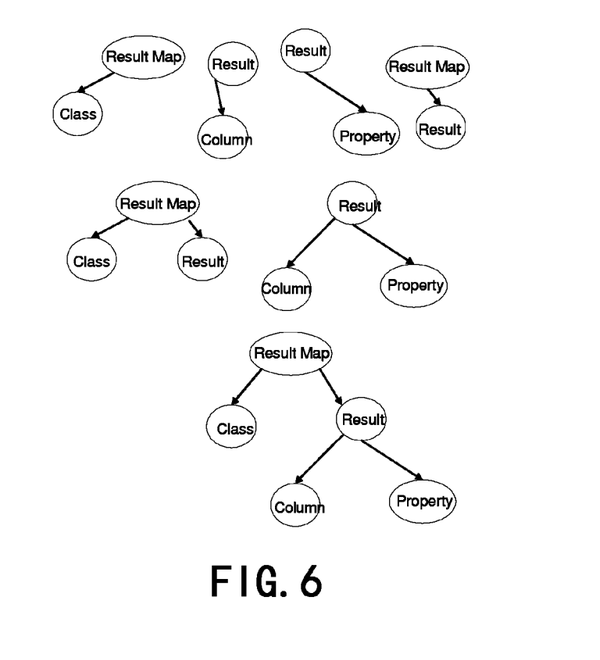
FIG. 6 illustrates a schematic diagram of codes in accordance with one embodiment.

FIG. 6 illustrates an example of codes. Such codes can be from one of the several sources of the foregoing code base. The included codes include Login.jsp for logging in and the codes of corresponding functions such as Dele\Creat\Retrieve\Update, etc in the list code List.jsp.

The following codes are a segment of the configuration file of the ibatis framework. Those skilled in the art will understand that the segment of configuration file is a portion of the classification configuration file base for CTP mining:

```
<select    id="QueryByName"    resultMap="BookQResult"
parameterClass= "String">select NM, AT, PR form T_B where NM =
#bName# </select>
<resultMap ID="BookQResult" Class="Book ">
<result column ="NM" Property = "name" jdbcType = "VARCHAR">
<result column = "AT" Property = "author" jdbcType = "VARCHAR">
<result column = "PR" Property = "price" jdbcType ="VARCHAR">/
result>
```

Figure 7:
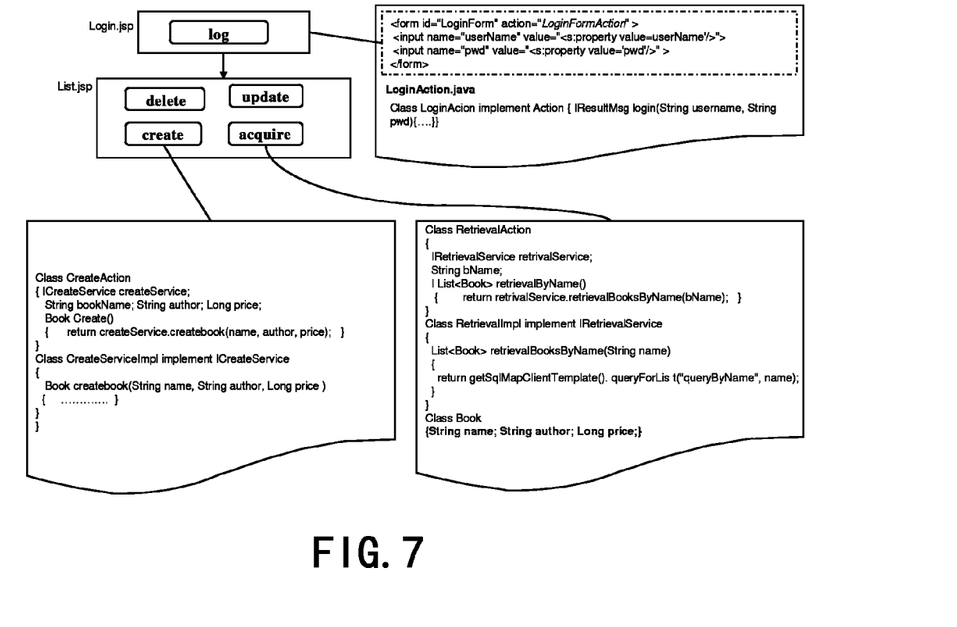
FIG. 7 illustrates a schematic diagram of generating CTP with respect to an exemplary configuration file in accordance with one embodiment.

FIG. 7 illustrates a schematic diagram of generating CTP with respect to an exemplary configuration file in accordance with one embodiment. Specifically, it can be done according to the steps in FIG. 3.

According to steps 301-302 in FIG. 3, the method includes starting constructing a subtree set from root node in a classified configuration file base. In the first line in FIG. 7 is a subtree set constructed from a root node. In the illustrated subtree set, some subtrees contain a root node, but others do not contain a root node. Those skilled in the art can also construct subtree set that only contain root nodes.

According to step 303 in FIG. 3, the method includes retaining subtrees satisfying a Minimum Support. Here, because there is only one source file base, the support is 100%. When the value of the Minimum Support is 70%, all the subtrees satisfy the Minimum Support.

According to step 304 in FIG. 3, the method includes merging these subtrees and generating new subtrees. Subtrees that have a common sub-structure can be merged to generate new subtrees. For example, the first layer and the second layer in FIG. 7 indicate such a process.

According to steps 304-305 in FIG. 3, the process continues until the merging is impossible or there is no subtree satisfying the Minimum Support after the merging. Then the subtrees obtained in the previous round are the resulting set. Closed frequent subtrees shown in the third layer are finally obtained.

Further, codes associated with the configuration files are obtained to generate syntax trees. In this example, since the value of ID is "BookQResult", the value of Class is "Book" and the value of Column is "NM", codes in which these values appear are found and acquired as potentially associated code segments. Therefore, with respect to values "name", "author", and "price" that appear in the configuration files, a corresponding code segment "Class Book" is acquired for mining of syntax trees.

Class Book
{String name; String author; Long price;}
...

Figure 8:
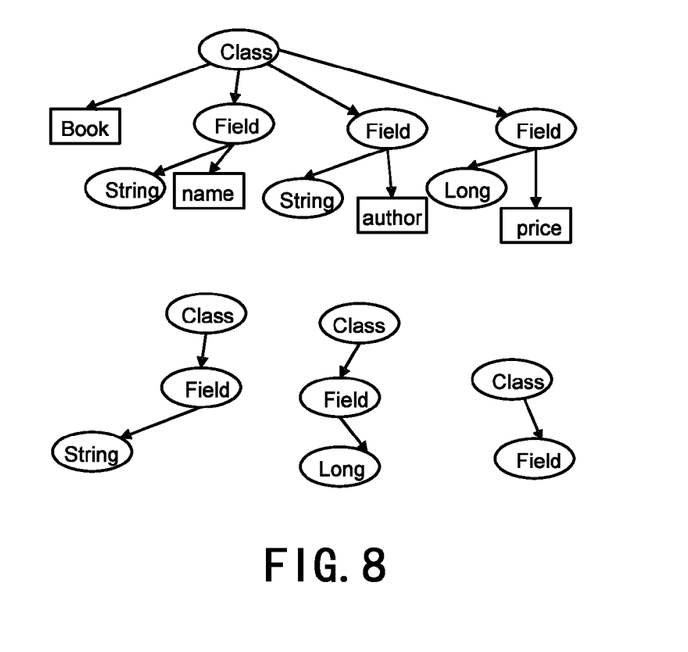
FIG. 8 illustrates a schematic diagram of generating STP with respect to a code segment in accordance with one embodiment.

FIG. 8 illustrates a schematic diagram of generating STP with respect to an exemplary code segment in accordance with one embodiment, specifically, a schematic diagram of the process of acquiring syntax trees generated by the code segment according to prior art. The ellipse shape denotes a subordinate node and the rectangular shape denotes an attribute value. The attribute value is a point that generates association. Obviously, in this embodiment, the syntax tree class-field describes an important pattern. The importance can be represented by either the support or the frequency shown in the drawing.

Next, an association is created according to the flow shown in FIG. 4: according to the CTP and the STP's, subordinate nodes have the same attribute values, an association is created, and the confidence of the association satisfies a predetermined requirement.

Figure 9:
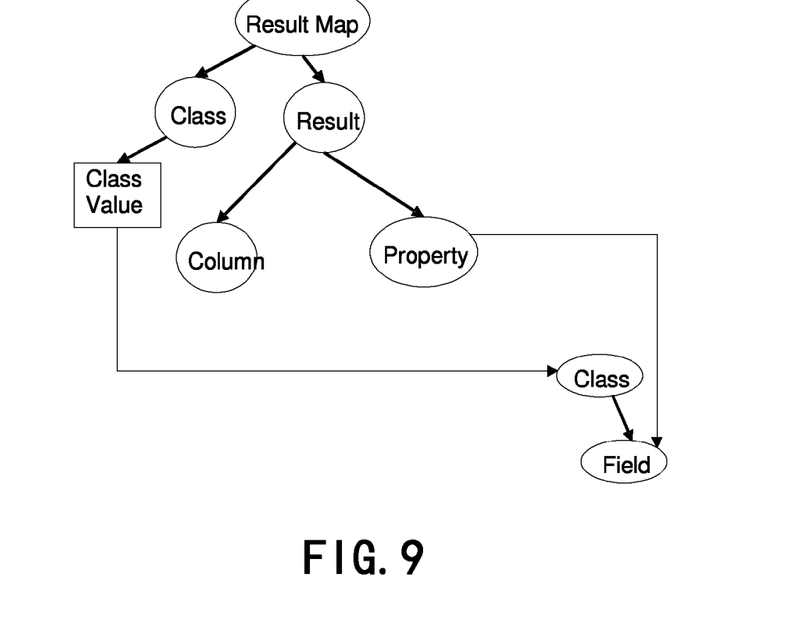
FIG. 9 illustrates a schematic diagram of establishing an association in accordance with one embodiment.

With reference to FIG. 9, both of the attribute values of the subordinate node Class of the CTP on the left side and the subordinate node Class of the STP on the right side are "Book", and there is an association of the CTP and the STP with respect to the subordinate node Class. Likewise, both of the attribute values of the subordinate node Property of the CTP and the subordinate node Field of the STP are "price", and there is also an association with respect to the subordinate nodes property and field. Although these two associations are not equal to nodes that generate associations, if the probability that these two associations appear simultaneously is also greater than the minimum confidence, these two associations can be merged. For example, in FIG. 9, the CTP is on the left and the STP is on the right. Since the association that satisfies the corresponding value of Class and the association that satisfies the corresponding value of Property often appear simultaneously, they can be merged.

Figure 10:
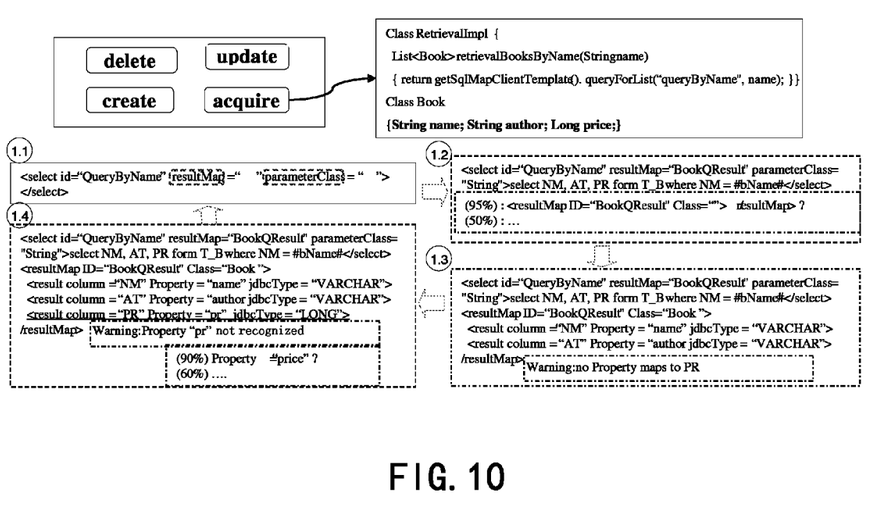
FIG. 10 illustrates a schematic diagram of programming assistance in accordance with one embodiment.

After the association between the CTP and the STP is created, the checking or recommending of codes can be performed according to the CTP or the association. FIG. 10 illustrates an embodiment where the programming assistance is performed for a configuration file being coded: if current input focus is pr, the CTP with which the prefix tree at the location of pr matches is that if the current input focus is "pr", and the prefix tree at the location of pr is ResultMap-result-property. In this way, it is possible to find matched CTP, such as the CTP shown in FIG. 8. So, it is possible to perform the recommendation of code structures. In addition, it is also possible to have already created the association between the CTP and the STP by previous mining. That is, if the attribute value of Class Name of the CTP is the same as the name of Class in the STP, the attribute value of Property in the CTP should also be the name of Field in the same Class. Therefore, the recommending and checking of values is performed according to the association of the CTP and the STP created during mining, i.e., recommending or checking this place should be Price but not pr. The result of checking can be presented in a form of "Warning". Specifically, FIG. 10 illustrates programming assistance from the following several perspectives: in 1.1, in the node Select, with the technical solution of the present invention, it can be determined that the attributes ID, resultMap, and parameterClass often appear together to represent a complete logic, whereby the recommendation of structures can be performed. In 1.2, if <xxx resultMap=" "> appears in the Element of Select, an Element named as ResultMap will appear in the same XML configuration and this Element has the same value as that of the above resultMAP. In 1.3, all the returning results of values in Select require using corresponding Result nodes. Here, PR does not have a corresponding node, so a warning can be given in the way of "Warning: no Property maps to PR". In 1.4, in Result-Map, if the value of Class attribute has been designated as the Class of Book, in the following subnode Result, all the values of Property must be the name of Field in the Class of Book. Therefore, it is possible to warn that the attribute value pr cannot be recognized by "Warning: Property "pr" not recognized", so as to recommend the attribute value "price" for Property.

It should be noted that the above description is only illustrative and is not to limit the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of non-transient program code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A programming assistance method for a framework-based application program, said application program containing program files and configuration files, the method comprising:
    processing configuration files of an application program history base into a configuration file classification base according to types of frameworks;
    constructing a Closed Frequent Subtree Set according to said configuration file classification base and determining a support of said Closed Frequent Subtree;
    constructing a Syntax Tree Set according to program files of said application program history base;
    obtaining a Closed Frequent Subtree Subset satisfying a Minimum Support in said Closed Frequent Subtree Set;
    obtaining a Syntax Tree Subset satisfying a Minimum Support in said Syntax Tree Set;
    creating an association subtree set according to subordinate nodes having the same attribute values in said Closed Frequent Subtree Subset and said Syntax Tree Subset, said association subtree set including at least one Closed Frequent Subtree and Syntax Tree associated with each other; and
    at least one of recommending and validating attribute values of a new configuration file according to said created association subtree set when the new configuration file is programmed.

2. The method according to claim 1, wherein said Closed Frequent Subtree has a root node and satisfies a predetermined Minimum Support.

3. The method according to claim 2, wherein constructing a Closed Frequent Subtree Set according to said configuration file classification base comprises:
    constructing a subtree set according to configuration files in said configuration file classification base, said subtree set having at least a subtree that contains a root node;
    merging subtrees that have a common sub-structure and satisfy said Minimum Support in said subtree set to generate a new subtree set, retaining new subtrees that satisfy said Minimum Support in said new subtree set, repeating said merging and retaining steps until at least one of the following occurs: said merging is impossible and it is impossible to generate a new subtree satisfying said Minimum Support through said merging; and
    determining said Closed Frequent Subtree Set according to said new subtrees generated in the previous round.

4. The method according to claim 1, wherein said Syntax Tree Set is constructed with respect to codes associated with said configuration files.

5. The method according to claim 1, further comprising: at least one of recommending and validating code structures of a new configuration file according to said provided Closed Frequent Subtree Set and said support when the new configuration file is programmed.

6. The method according to claim 5, wherein at least one of said recommending and validating code structures comprises:
    extracting a prefix tree of the editing focus in said new configuration file being currently programmed;
    querying subtrees that match with said prefix tree among said Closed Frequent Subtrees; and
    at least one of recommending and validating code structures according to said matched subtrees and their supports.

7. The method according to claim 1, wherein at least one of said recommending and validating attribute values comprises:
    extracting a prefix tree of the editing focus in said new configuration file being currently programmed;
    querying subtrees that match with said prefix tree among said Closed Frequent Subtrees; and
    performing at least one of the recommendation and validation of attribute values according to said matched frequent subtrees and syntax trees associated therewith.

8. A programming assistance apparatus for a framework-based application program, said application program contains program files and configuration files, comprising:
    a device configured to process configuration files of an application program history base into a configuration file classification base according to types of frameworks;

a device configured to construct a Closed Frequent Subtree Set according to said configuration file classification base and determine a support of said Closed Frequent Subtree;

a device configured to construct a Syntax Tree Set according to program files of said application program history base;

a device configured to obtain a Closed Frequent Subtree Subset satisfying a Minimum Support in said Closed Frequent Subtree Set;

a device configured to obtain a Syntax Tree Subset satisfying a Minimum Support in said Syntax Tree Set;

a device configured to create an association subtree set according to subordinate nodes having the same attribute values in said Closed Frequent Subtree Subset and said Syntax Tree Subset, said association subtree set including at least one Closed Frequent Subtree and Syntax Tree associated with each other; and a device configured to perform at least one of recommending and validating attribute values of a new configuration file according to said created association subtree set when the new configuration file is programmed.

9. The apparatus according to claim 8, wherein said Closed Frequent Subtree has a root node and satisfies a predetermined minimum support.

10. The apparatus according to claim 9, wherein said device configured to construct a Closed Frequent Subtree Set according to said configuration file classification base and determine a support of said Closed Frequent Subtree comprises:

a device configured to construct a subtree set from configuration files in said configuration file classification base, said subtree set having at least a subtree that contains a root node;

a device configured to merge subtrees that have a common sub-structure and satisfy a predetermined Minimum Support in said subtree set to generate a new subtree set, retain new subtrees that satisfy said Minimum Support in the new subtree set, repeat said merging and retaining steps until it is impossible to generate a larger new subtree satisfying said Minimum Support through the merging; and a device configured to determine said Closed Frequent Subtree Set according to new subtrees generated in the previous round.

11. The apparatus according to claim 8, wherein said Syntax Tree Set is constructed with respect to codes associated with said configuration files.

12. The apparatus according to claim 8, comprising: a device configured to perform at least one of recommending and validating code structures of a new configuration file according to said provided Closed Frequent Subtree Set and said support when the new configuration file is programmed.

13. The apparatus according to claim 12, wherein said device configured to perform at least one of recommending and validating code structures comprises:

a device configured to extract a prefix tree of the editing focus in said new configuration file being currently programmed;

a device configured to query subtrees that match with said prefix tree among said Closed Frequent Subtrees; and a device configured to perform at least one of recommending and validating code structures according to said matched subtrees and their supports.

14. The apparatus according to claim 8, wherein said device configured to recommend or validate attribute values comprises:

a device configured to extract a prefix tree of the editing focus in said new configuration file being currently programmed;

a device configured to query subtrees that match with said prefix tree among said Closed Frequent Subtrees; and a device configured to perform at least one of the recommendation and validation of attribute values according to said matched frequent subtrees and syntax trees associated therewith.

\* \* \* \* \*